United States Patent [19]
Kolin

[11] 3,911,742
[45] Oct. 14, 1975

[54] RADIAL FIELD ELECTROMAGNETIC FLOW METER
[75] Inventor: Alexander Kolin, Bel Air, Calif.
[73] Assignee: Regents, University of California, Berkeley, Calif.
[22] Filed: Mar. 16, 1973
[21] Appl. No.: 341,825

Related U.S. Application Data
[63] Continuation of Ser. No. 232,500, March 7, 1972, which is a continuation of Ser. No. 34,214, May 4, 1970, abandoned.

[52] U.S. Cl. .................. 73/194 EM; 128/2.05 F
[51] Int. Cl. ............................................ G01f 1/00
[58] Field of Search ............ 73/194 EM; 128/2.05 F

[56] References Cited
UNITED STATES PATENTS
2,691,303   10/1954   DeBoisblanc ................. 73/194 EM
3,487,826   1/1970   Barefoot ....................... 128/2.05 F

*Primary Examiner*—Charles A. Ruehl
*Attorney, Agent, or Firm*—Jessup & Beecher

[57] ABSTRACT

An electromagnetic flow meter, or transducer, of the catheter type is provided. The electromotive force induced in fluid by a radial magnetic field and developed across a pair of electrodes is utilized in the catheter-type flow meter, the fluid flowing parallel to the cylindrical axis of symmetry of the field. Induced currents are suppressed or inhibited by means of a dielectric septum, or partition, positioned between the electrodes.

2 Claims, 5 Drawing Figures

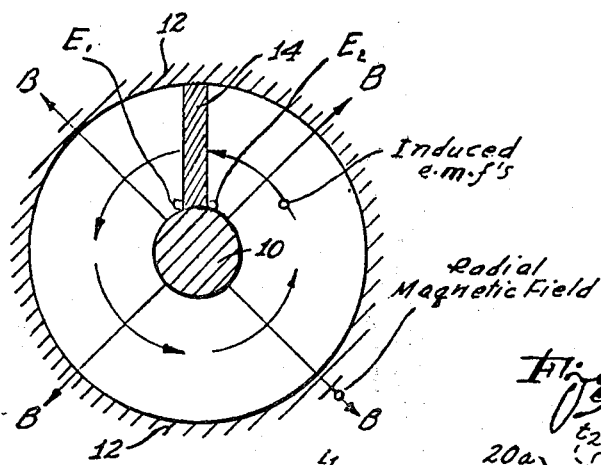
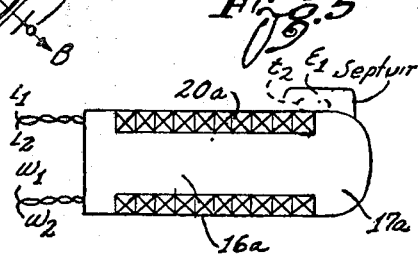
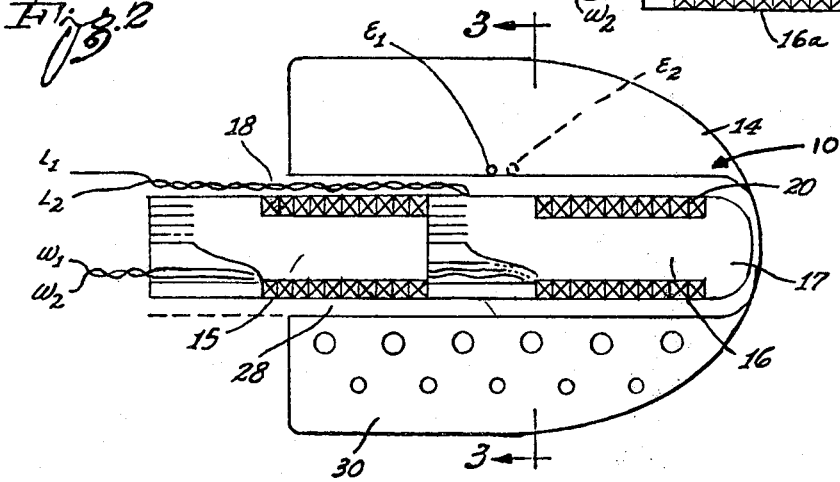
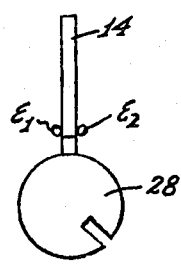
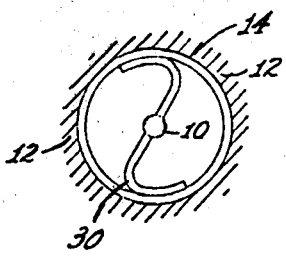

RADIAL FIELD ELECTROMAGNETIC FLOW METER

The invention herein described was made in the course of, or under, a grant from the United States Public Health Service, Department of Health, Education and Welfare, and under a contract of the Office of Naval Research.

This application is a continuation of copending application Ser. No. 232,500, filed Mar. 7, 1972, which was in turn a continuation of application Ser. No. 34,214, now abandoned, filed for Alexander Kolin on May 4, 1970, and entitled Radial Field Electromagnetic Flow Meter.

BACKGROUND OF THE DISCLOSURE

The electromagnetic flow meter, or transducer, is an instrument which may be used to measure the flow of a liquid, such as blood, in a conduit, such as a blood vessel. The instrument creates a magnetic field across the conduit, and it includes a pair of electrodes which contact the liquid flowing in the conduit. An EMF is developed across the electrodes by the liquid which is proportional to the velocity of the liquid.

As described, for example, in an article by the present inventor in the Journal of Applied Physics, Volume 15, Page 150, 1944, the development of electromagnetic flow meters has been stimulated by the physical interest in determinations of local velocities of flow in studies of fluid velocity distributions and turbulence. Electromagnetic flow meters have proven subsequently to be of equal interest to medical physiologists and cardiologists as a method for intravascular measurement by catheter flow meters of the rate of blood flow through major blood vessels of animals and man. This is reviewed in an article by A. Kolin, G. Ross, J. Grollman and J. Archer in the Proceedings of the National Academy of Sciences, Volume 59, Page 808, 1968.

By virtue of uniformity of the velocity of blood flow throughout the cross-section of the aorta carrying a pulsating flow of blood, the volume rate of flow can be determined easily from the artery diameter which may be measured radiographically, and the linear flow velocity measured by an electromagnetic flow meter measuring the average rate of flow in the conduit, or a velometer responding to local flow velocity in its immediate vicinity. A velometer can also measure the rate of flow in an unconfined fluid.

The principle of the electromagnetic flow meter, or transducer, to be described herein differs substantially from those previously presented in the art. In fact, the principle of operation of the electromagnetic flow meter of transducer of the present invention is based on a modification of a configuration which has been properly described, for example, by J. A. Shercliff in Theory of Electromagnetic Flow Measurement, Cambridge University Press New York; Cambridge 1962, as incapable of yielding a flow signal.

However, in the practice of the present invention, and by an appropriate modification, the configuration described by Shercliff as basically inoperative, has been made to constitute an electromagnetic flow transducer of exceptional strength, simplicity, smallness and sensitivity. The transducer of the present invention is of particular interest because its diameter may be sufficiently small so as to have clinical interest in the introduction of a measuring device, constructed in accordance with the invention, percutaneously through a small opening in a patient's skin, in the same manner as angiographic catheters are introduced into the vascular system. It may also be useful in hydraulic flow velocity measurements in pipes and open channels, rivers, and the like, as well as for measurements of boat velocities.

In the Shercliff text "Theory of Electromagnetic Flow Measurement" referred to above, the author points out several examples of various possible field configurations for suitable electromagnetic flow measurement. It is stated in the text "In selecting configurations suitable for electromagnetic induction flow meters one must avoid those where the induced electromotive force is entirely lost or short-circuited." Shercliff then provides an example of such an inoperative configuration as one in which there is a radial magnetic field, and he points out that in such a case the circulating current dissipates the electromotive force in ohmic losses.

By the practice of the present invention, however, it is possible to use the configuration of the radial field effectively, as will be described, so as to provide an improved electromagnetic flow meter suitable for the purposes outlined above.

BRIEF DESCRIPTION OF THE DRAWING

FIG. 1 is a schematic representation showing a radial magnetic field generated by a transducer magnet centered in a conduit;

FIG. 2 is a side view, partly in section, of a radial field electromagnetic flow transducer constructed in accordance with the concepts of the present invention;

FIG. 3 is a sectional view of the transducer of FIG. 2 taken along the line 3—3 of FIG. 2;

FIG. 4 is an end view of the transducer, and showing the manner in which the transducer is centered in the conduit in which it is introduced; and FIG. 5 is a side section of a second embodiment of the flow tranducer of the invention.

DETAILED DESCRIPTION OF THE ILLUSTRATED EMBODIMENT

There is illustrated in FIG. 1 a cross-section of a source 10 of a radial magnetic field at the center of a conduit 12. Both the source 10 and the conduit 12 are in the form of coaxial cylinders with the common axis extending up out of the plane of the drawing. Should a fluid flow occur in the conduit 12 parallel to the aforesaid axis, the radial magnetic field generated by the source 10, as symbolized by the radial vectors B, will produce tangential electromotive forces and currents, as represented by the curve arrows, in the absence of a dielectric septum, such as the septum designated 14. Electrodes such as those designated $E_1$ and $E_2$ will then exhibit no potential difference in the absence of the dielectric septum 14, and there will be no flow signal if the fluid flow is maintained parallel to the central axis of the conduit 12.

However, if a dielectric partition in the form of the radially positioned septum 14 is provided, the flow of the induced eddy currents is blocked, and the induced electromotive force is no longer dissipated through ohmic losses. The electrodes $E_1$ and $E_2$ are disposed adjacent to one another, as shown in FIG. 1, but are insulated from one another by the septum 14. The septum need not reach the tube wall, and the sensor need not be located along the conduit axis; it must merely be parallel to it and not too close to the conduit wall. Even a 2 or 1 mm septum may be sufficient to make the device operable. These electrodes will now exhibit an electromotive force resulting from tangential Lorentz forces acting around the circumference of the source 10 upon the ions in the flowing fluid. This electromotive force is a measure of the velocity of the fluid flowing parallel to the axis of the source, as described in an article by the present inventor in the Trans. Biomed Engr. BME-16, 220, 1969.

The following simple mathematical analysis reveals a particularly valuable property in the configuration represented schematically in FIG. 1. For example, the intensity B of the radial magnetic field is represented as $$B = \frac{B_0}{r} \quad (1)$$

The tangential component of the induced electric field is $$dV/ds = 10^{-8} Bv \quad (2)$$

where:
  $dV$ is expressed in volts, the element of arc $ds$ is expressed in centimeters;
  B is expressed in gauss; and
  v is expressed in cm/sec The term $ds$ may be expressed in terms of the radius 4 of the circular arc and the angle $d\theta$ subtended by $ds$ at the center of curvature of the arc. The equation (2) may then be expressed as:

$dv = 10^{-8} Bvrd\theta$ (2A)

In the uniform velocity field, the potential difference between the electrodes (assuming the thickness of the dielectric septum 14 to be negligible), is, if equation (1) is taken into consideration:

$$V = 10^{-8}v \int_0^{2\pi} \frac{B_0}{r} rd\theta = 10^{-8} 2\pi B_0 v \quad (3)$$

The flow signal V is independent of the radius of the integration path and, hence, also of the radius of the magnetic source 10. Therefore, it follows that the transverse dimensions of the flow sensor can be miniaturized without loss in sensitivity.

A practical embodiment of the radial field flow electromagnetic transducer of the invention is shown in FIGS. 2–4. The transducer source 10 of the radial magnetic field has an iron core which is machined down into two sections designated 15 and 16, and which form bobbins on which two series-connected coils 18 and 20 are wound. The coils may be formed, for example, of two layers of No. 36 Boudeze wire and 84 turns per coil. The magnetic core has a head at its right-hand end, as shown, of increased diameter, as designated 17. The diameter of the head 17, for example, may be of the order of 2 millimeters. The coils 18 and 20 may each have a length, for example, of 7 millimeters, and the spacing between the coils may be of the order of 4 millimeters.

An electric current is supplied to the coils by leads $W_1$ and $W_2$ which pass through grooves formed in the core. The coils are connected in opposite directions, so that when an electric current is passed through the coils from the leads $W_1$ and $W_2$, like poles appear between the sections 15 and 16 of the core. This results in an essentially radial magnetic field across the section of the assembly between the two core sections 15 and 16. Such a cylindrically symmetrical radial field has been previously described by the present inventor in the Journal of Chromatography, Vol. 26, Page 164, 1967, in connection with the stabilization of electrophoresis by the electromagnetic rotation of fluid.

The iron core 15, 16 actually is dispensable because there is a radial magnetic field component at the ends of a solenoid as well as in the space between two coaxial solenoids facing each other with like magnetic polarity. In some instances it may be advantageous to surround the transducer magnet to the outer cylinder by means of a rigid septum.

The iron core sections 15 and 16 have grooves formed in them, as mentioned above, so as to permit the leads $W_1$ and $W_2$ to be connected to the coils 18 and 20. Further leads $L_1$ and $L_2$ are connected to respective ones of the electrodes $E_1$ and $E_2$ which are positioned on opposite sides of the dielectric septum 14.

The dielectric septum 14 may be made of silicone rubber sheeting, for example, 0.5 millimeters thick, and which may be cemented to the transducer body by means, for example, of General Electric RTV112 "Silastic" cement. The transducer body may be covered, for example, with a layer of "Hysol" epoxy to form an insulating coating 28. However, the septum 14 may be made relatively narrow so as to fit into the conduit 12, in which case the septum may be formed of a rigid dielectric material, if so desired. For example, the septum 14 may have a width of 1 millimeter or less.

A perforated septum 30 on the underside of the transducer serves no electrical function. This latter septum is added to stabilize and provide centering of the transducer in the conduit 12, such as a blood vessel, and as illustrated in FIG. 4. The septa 14 and 30 may constitute two flexible wings which may be easily wrapped around the transducer body as it is introduced through a narrow branch of a larger conduit 12. The "wings" then expand in the larger conduit and center the assembly 10 in the conduit, as shown in FIG. 4. The septum 30 can be omitted if desired since, as noted, it serves no electrical function.

As noted, perforations are provided in the septum 30 to preserve electrical continuity in the fluid around the transducer, so that only the septum 14 blocks or impedes the flow induced eddy currents. The left-hand end of the assembly (FIG. 2) may be connected to a flexible catheter, similar to those described, for example, by A. Kolin et al. in the Proceedings of the National Academy of Science, Volume 59, Page 808, 1968, and the lead wires $W_1$, $W_2$ and $L_1$, $L_2$ may be extended up through the flexible catheter.

The construction illustrated in FIG. 2, for example, may be simplified if a loss in sensitivity by a factor of about 2 can be tolerated. In such a case, the second coil is omitted and replaced by an epoxy cylinder. In the latter configuration, there is still a region with sufficiently intense radial magnetic field component near the right pole of the remaining iron core section. The septum 14 need not be long enough to reach the wall of the conduit. However, a short septum reduces the transducer sensitivity. For example, for a 5 millimeter diameter probe, the sensitivity drops by about 10% for a 5 millimeter septum width; it is reduced to 25% at 1 millimeter width and drops to zero when the septum is removed.

The flow meter can be calibrated by relative movement through a trough filled with saline, as described, for example, in the aforesaid article by A. Kolin et al in the Proceedings of the National Academy of Science, or by perfusion in a tube. A fluid velocity of 1 centimeter per second can readily be detected. The base line is adjusted with the transducer immersed in stationary fluid by adjusting the phase-setting of a standard sinusoidal wave electromagnetic flow meter, such as the Medicon "Microflo" unit until switching the output short-circuiting switch on and off produces no change in meter reading. This adjustment yielding a zero reading at zero flow provides optimal sensitivity to flow.

Only one coil is actually necessary to generate a radial magnetic field because if we have, for instance, a solenoid surrounding an iron core there is a radial component of the magnetic field in the plane perpendicular to the core axis, which plane passes through the poles. Such an embodiment is shown in FIG. 5, in which a coil 20a is wound on a core 16a, having a head 17a; and in which the electrodes $E_1$ and $E_2$ are separated by a septum. The electrodes and septum, as shown, are placed near a pole and in a zone of substantially radial magnetic field. This results in a sensor which is less sensitive than the previous embodiment, but still very effective and much simpler to make.

The invention provides, therefore, an electromagnetic catheter type flow meter which is predicated upon a radial magnetic field. The flow meter of the invention responds to fluid flow in its surroundings parallel to the axis of its cylindrical body. The operation of the flow meter, as described above, depends on the use of a dielectric septum between the electrodes and which serves to interrupt the flow of induced current which otherwise would reduce the flow signal to zero. The flow meter of the invention has been found to have high sensitivity for small lateral dimensions and incorporates, for example, an iron core skeleton for high mechanical strength.

Although the flow meter described above is intended primarily to measure fluid flow in a conduit, or an unconfined fluid it may also be used to measure the velocity of a body, such as a boat, with respect to the fluid in which it is immersed.

While particular embodiments of the invention have been shown and described, modifications may be made, and it is intended in the following claims to cover all such modifications which fall within the spirit and scope of the invention.

What is claimed is:

1. An electromagnetic flow meter for measuring flow of liquid in a conduit, comprising:
    magnetic means for creating a magnetic field within the conduit having a substantial radial component extending across the conduit with respect to the central axis of said magnetic means, so as to produce tangential electromotive forces in the flowing liquid;
    dielectric septum means mounted adjacent said magnetic means and extending radially across the conduit from the central axis thereof to block the flow of electrical eddy currents in the liquid induced by said electromotive forces;
    first and second electrodes mounted adjacent said magnetic means on opposite sides of said septum means in contact with the liquid, for exhibiting an electromotive force which is a measure of the velocity of the liquid in the conduit;
    said magnetic means including:
        a pair of spaced elongate magnetic core sections extending parallel to the central axis of the conduit;
        a pair of series-connected coils wound around said respective core sections in opposite directions; and
        means for causing an electric current to flow through said coils so as to create a substantially radial magnetic field intermediate said core sections,
    said electrodes being positioned in said radial field.

2. The flow meter of claim 1 in which said septum means comprises a resilient member formed of rubber-like material and having a wing like configuration.

* * * * *